(12) United States Patent
Jones

(10) Patent No.: US 12,510,936 B2
(45) Date of Patent: Dec. 30, 2025

(54) FOLDABLE ELECTRONIC DEVICES WITH OBJECT DETECTION SENSORS

(71) Applicant: Apple Inc., Cupertino, CA (US)

(72) Inventor: Christopher D Jones, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 18/670,070

(22) Filed: May 21, 2024

(65) Prior Publication Data

US 2025/0362717 A1 Nov. 27, 2025

(51) Int. Cl.
G09G 5/00 (2006.01)
G06F 1/16 (2006.01)
G06F 3/044 (2006.01)

(52) U.S. Cl.
CPC .......... *G06F 1/1679* (2013.01); *G06F 1/1616* (2013.01); *G06F 1/1652* (2013.01); *G06F 1/1681* (2013.01); *G06F 1/1686* (2013.01); *G06F 3/044* (2013.01); *G06F 2203/04105* (2013.01)

(58) Field of Classification Search
CPC .... G06F 1/1616; G06F 1/1652; G06F 1/1679; G06F 1/1681; G06F 1/1686; G06F 3/044; G06F 2203/04102; G06F 2203/04105; G09F 9/301
See application file for complete search history.

(56) References Cited

U.S. PATENT DOCUMENTS

| | | | |
|---|---|---|---|
| 10,063,677 B2 * | 8/2018 | Cavallaro | G06F 1/1626 |
| 10,133,310 B2 | 11/2018 | Kim et al. | |
| 10,514,877 B2 | 12/2019 | Becze | |
| 10,564,675 B2 | 2/2020 | Ka et al. | |
| 10,678,428 B2 | 6/2020 | Kim et al. | |
| 11,462,194 B1 | 10/2022 | Wang et al. | |
| 11,592,878 B2 * | 2/2023 | Cavallaro | G06F 1/1616 |
| 11,635,931 B2 * | 4/2023 | Kumar Agrawal | G06F 1/1632 345/1.1 |
| 11,829,200 B2 * | 11/2023 | Lee | G06F 3/0488 |
| 12,242,317 B2 * | 3/2025 | Sisodia | G06F 1/1683 |
| 12,392,831 B2 * | 8/2025 | Kumar Agrawal | G06F 1/206 |

FOREIGN PATENT DOCUMENTS

WO WO-2024158124 A1 * 8/2024 ............ G06F 3/041

* cited by examiner

*Primary Examiner* — Joe H Cheng
(74) *Attorney, Agent, or Firm* — Treyz Law Group, P.C.; Kendall P. Woodruff

(57) ABSTRACT

An electronic device may include a foldable housing having first and second housing portions coupled by a hinge. A flexible display may overlap the hinge and may have first and second display regions respectively overlapping the first and second housing portions. An object detection sensor may be configured to detect objects on the display that might cause damage to the display if the device is folded closed while the object is present. The object detection sensor may include an image sensor, a capacitive sensor, a strain gauge, and/or other suitable sensors. In response to detecting an object on the display with the object detection sensor, movement of the first housing portion relative to the second housing portion may be restricted, an alert may be issued, air may be blown across the display, and/or other actions may be taken.

20 Claims, 13 Drawing Sheets

FOLDABLE ELECTRONIC DEVICES WITH OBJECT DETECTION SENSORS

FIELD

This relates generally to electronic devices and, more particularly, to foldable electronic devices.

BACKGROUND

Electronic devices such as laptop computers, cellular telephones, and other equipment may include displays. To enhance portability, devices may be provided with the ability to fold. A foldable device may be placed in an unfolded configuration to expand the size of the device and thereby facilitate user interaction with the device. When it is desired to enhance portability, the foldable device may be placed in a folded configuration.

A display in a foldable device is sometimes provided with a thin cover layer to protect the display while also permitting the display to bend as the device is folded. If care is not taken, damage can be caused to the cover layer or underlying display layers if the device is folded while an object is on the display.

SUMMARY

An electronic device may be provided with a display mounted in a housing. The display may have an array of pixels that form an active area for displaying images. The array of pixels may be formed on a flexible substrate so that the display is flexible and bends about a bend axis as the housing is folded and unfolded.

The electronic device may include a foldable housing having first and second housing portions coupled by a hinge. A flexible display may overlap the hinge and may have first and second display regions respectively overlapping the first and second housing portions. An object detection sensor may be configured to detect objects on the display that might cause damage to the display if the device is folded closed while the object is present.

The object detection sensor may include an infrared camera, a visible light camera, or other optical sensor, an ultrasonic sensor, a radio-frequency sensor, a strain gauge, a capacitive force sensor or other touch sensor, and/or other suitable sensors. Operation of the device may be adjusted based on information from the object detection sensor. For example, movement of the first housing portion relative to the second housing portion may be restricted (e.g., via a locking hinge, a stop structure, etc.), an alert may be generated (e.g., a visual alert, an audible alert, a haptic alert, etc.), air may be blown across the display, and/or other actions may be taken in response to detecting an object on the display with the object detection sensor.

DETAILED DESCRIPTION

An electronic device may include one or more displays. In some arrangements, an electronic device may be a foldable electronic device having first and second housing portions that rotate relative to one another about an axis (e.g., a folding axis, a bend axis, etc.). The display may be a flexible display that overlaps the first and second housing portions and that bends along the folding axis.

Flexible displays that fold along a fold axis may sometimes be provided with display cover layers. For example, a transparent display cover layer formed from one or more polymer layers and/or one or more glass layers may extend across some or all of the flexible display to protect the flexible display from damage. A display cover layer may use relatively thin polymer layers and/or thin glass layers to increase display protection while also allowing the flexible display to bend around a tight bend radius. If care is not taken, a display cover layer may be vulnerable to puncture failure. For example, a blunt object that is pushed into the cover layer may result in puncturing and/or bending of the cover layer (e.g., a glass layer in the cover layer) and/or the flexible display. If an object such as a cellular telephone or stylus is left on the display when the user attempts to close (e.g., fold) the electronic device, the object may inadvertently be pushed into the display, causing damage to the cover layer and/or the underlying display layers.

To avoid unintentional damage to the display, an electronic device may include one or more object detection sensors for detecting objects on the display. If an object is detected on the display (e.g., for a period of time that is longer than the time of a typical touch input from a finger or stylus), the electronic device may take appropriate action by locking the hinge (e.g., preventing full closing of the electronic device), deploying a stop mechanism that prevents full closing of the electronic device, displaying a warning or other message, generating an audible or haptic alert, and/or taking other actions (e.g., blowing air across the display to remove sand or other small particles). The object detection sensor may include a camera or other image sensor, a capacitive sensor (e.g., capacitive touch sensor electrodes that also detect touch input on the display and/or capacitive sensing electrodes that are separate from the display's touch sensor), an ultrasonic sensor, a force sensor, a strain gauge, and/or any other suitable object detection sensor. If desired, the object detection sensor may detect the presence of an object and/or may be configured to determine the size, shape, and/or position of the object. If desired, the actions that are taken in response to detecting the object may be based on the size, shape, and/or position of the object. For example, the device may be prevented from folding past a certain threshold that is based on the size and/or position of the detected object, if desired.

Figure 1:
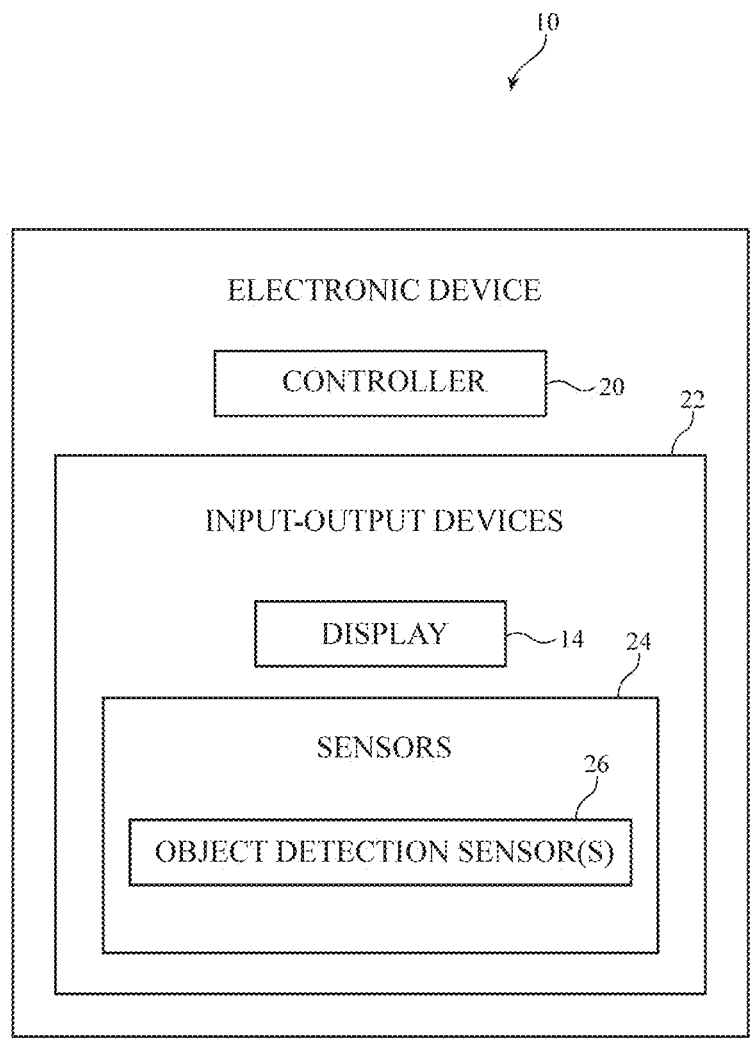
FIG. 1 is a schematic diagram of an illustrative electronic device having an object detection sensor in accordance with some embodiments.

An illustrative electronic device of the type that may be provided with a foldable display and one or more object detection sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which electronic device 10 is a portable electronic device such as a cellular telephone or tablet computer may sometimes be described herein as an example. This is, however, merely illustrative. Electronic device 10 may be any suitable electronic equipment.

As shown in FIG. 1, electronic device 10 may have controller 20 (also referred to as control circuitry 20 herein). Controller 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in controller 20 may be used to control the operation of device 10. The processing circuitry may be based on one or more microprocessors, microcontrollers, digital signal processors, baseband processors, power management units, audio chips, application specific integrated circuits, etc.

Controller 20 may include wired and/or wireless communications circuitry. The wireless communications circuitry of controller 20 may include one or more antennas and one or more radio-frequency transceiver circuits (e.g., a cellular telephone transceiver, a wireless local area network transceiver, etc.).

Device 10 may include input-output devices 22, which may allow data to be supplied to device 10 and to allow data to be provided from device 10 to external devices. Input-output devices 22 may include buttons, joysticks, scrolling wheels, keypads, keyboards, tone generators, haptic output devices such as vibrators, light-emitting diodes and other status indicators, data ports, etc. Input-output devices 22 may also include one or more displays, such as display 14, and one or more sensors, such as sensors 24. Devices 22 may also include light-emitting diodes (e.g., status indicator lights, a camera flash, etc.) and/or other light-emitting devices. Light-based (optical) components such as these (e.g., light-emitting device and/or light-based sensors) may be mounted under transparent window regions (e.g., a transparent window in a portion of display 14, a transparent window in a device housing, etc.).

Display 14 may be a touch screen display that includes a touch sensor for gathering touch input from a user, or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display (LCD), organic light-emitting diode (OLED) display, microLED display, or a display based on any other suitable display technology.

In some embodiments, display 14 may be a flexible display. In other words, display 14 may be bent along a bend axis to move display 14 between an open state and a closed state (and angles in between the open state and the closed state).

Sensors 24 may include touch sensors (e.g., capacitive touch sensors formed from arrays of capacitive touch sensor electrodes that overlap display 14 and/or that are formed elsewhere in device 10), microphones for gathering ambient noise measurements and voice commands, a magnetic sensor (e.g., a compass), an accelerometer, a gyroscope, a force sensor (e.g., a two-dimensional force sensor which may optionally overlap a touch sensor and/or display 14), a temperature sensor, a pressure sensor, a compass, etc. Sensors 24 may also include light-based sensors such as a light-based proximity sensor (e.g., an optical proximity sensor having an infrared light-emitting diode that emits light and having a corresponding infrared light detector for measuring the infrared light after the infrared light has reflected from an external object), an ambient light sensor (e.g., a color-sensitive ambient light sensor that can measure ambient light color and intensity), and a camera (e.g., a digital image sensor) for capturing images, and/or other image sensing and/or light-detecting devices.

Sensors 24 may also include object detection sensors such as object detection sensor(s) 26 for detecting objects on the display. Sensors 26 may include force sensors (e.g., strain gauges, capacitive force sensors, resistive force sensors, etc.), touch and/or proximity sensors such as capacitive sensors, optical sensors such as optical sensors that emit and detect light, ultrasonic sensors, and/or other touch sensors and/or proximity sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, and/or other sensors.

Object detection sensor 26 may be configured to determine whether an object is present on display 14 so that device 10 can take appropriate action to prevent display damage if necessary. In addition to presence detection, object detection sensor 26 may be configured to gather additional information about the objects on display 14, such as size, position, shape, material, type of object, the length of time that the object is present on display 14, and/or additional information. This information may be used to determine whether the object is likely to cause damage to display 14 if device 10 is closed while the object is present. If the sensor data from sensor 26 indicates that no damage is expected (e.g., if the object is sufficiently small, if the object is sufficiently soft, if the object is in a position that will not be pressed into display 14 if device 10 is closed, etc.), then no action is needed and device 10 may be permitted to freely close. If, on the other hand, object detection sensor 26 determines that an object is present (and, in some arrangements, if the object has a size, position, shape, and/or material that will likely cause damage to display 14 if device 10 is closed while the object is present), then controller 20 may take appropriate action by restricting motion of the housing of device 10 using one or more actuators (e.g., to lock a hinge, deploy a stop structure, etc.), generating a visual, audible, and/or haptic alert or message, blowing air across display 14, and/or taking other suitable actions.

Figure 2:
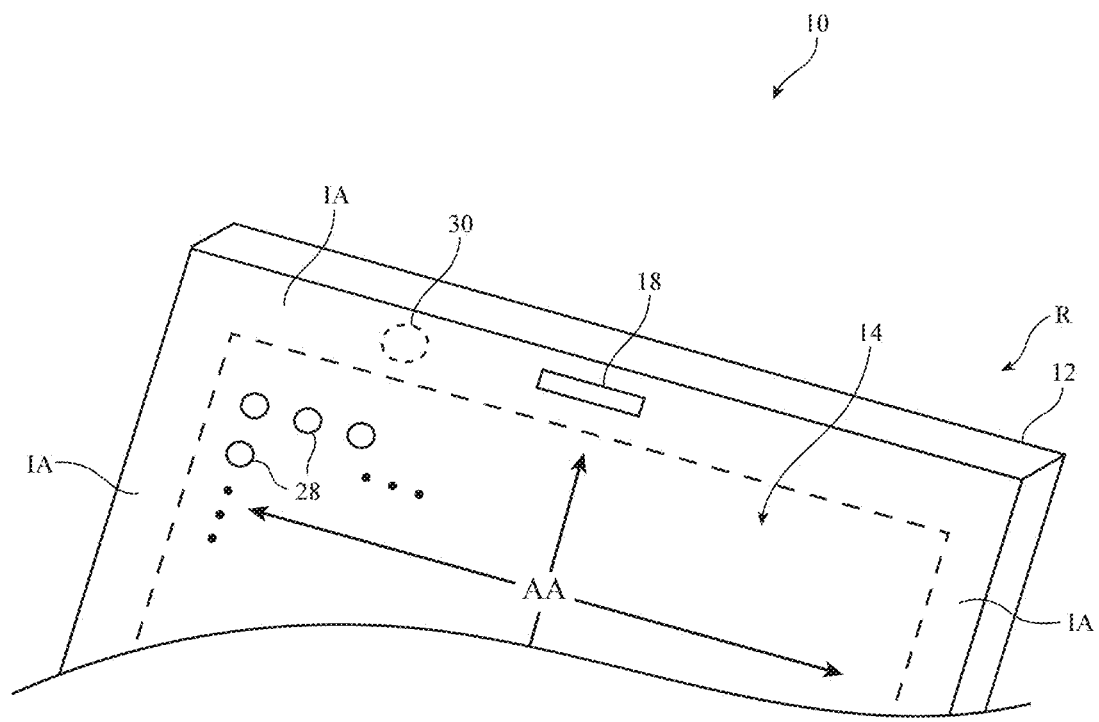
FIG. 2 is a perspective view of an illustrative electronic device with a display in accordance with some embodiments.

A perspective view of a portion of an illustrative electronic device that may include an object detection sensor is shown in FIG. 2. In the example of FIG. 2, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Portions of housing 12 may be formed from flexible materials (e.g., elastomeric materials such as silicone and/or other flexible polymers) and/or may include hinge structures (e.g., pivoting structures, single-bar or multibar linkages and/or other hinging mechanisms). Using these structures, housing 12 may bend about a bend axis (sometimes referred to as a bending axis, fold axis, folding axis, flex axis, etc.).

Openings may be formed in device 10. For example, an opening may be formed in display 14 to accommodate a button, a speaker port such as illustrative speaker port 18 of FIG. 2, or other components. Openings may be formed in housing 12 to form communications ports (e.g., an audio jack port, a digital data port, etc.), to form openings for buttons, openings for microphones and speakers, etc.

Display 14 may be a liquid crystal display, an electrophoretic display, an organic light-emitting diode display or other display with an array of light-emitting diodes, a plasma display, an electrowetting display, a display based on microelectromechanical systems (MEMs) pixels, or any other suitable display. Display 14 may have an array of pixels 28 in active area AA. Pixels 28 of active area AA may display images for a user of device 10. Active area AA may be rectangular or may have other suitable shapes. In some configurations, display 14 may have a flexible polymer substrate such as a polyimide substrate on which an array of pixel structures such as an array of organic light-emitting diodes and associated pixel circuits is formed. The flexible polymer substrate may facilitate bending. However, the use of a flexible polymer substrate to allow bending is merely illustrative. In general, display 14 may be a folding display with any suitable flexible display substrate.

Inactive border area IA may run along one or more edges of active area AA. Inactive border area IA may contain circuits, signal lines, and other structures that do not emit light for forming images. Masking structures (e.g., layers of black ink, etc.) may be used to hide inactive circuitry and other components in border area IA from view by a user of device 10. However, the inclusion of inactive border area IA is merely illustrative. In some embodiments, device 10 may not include an inactive border area, such as inactive border area IA around the edges of active area AA. For example, active area AA extend between opposing edges of device 10 and/or extend entirely across (or across nearly an entirety of) a front face of device 10.

In some arrangements, inactive area IA may protrude into the active area AA and/or may form one or more isolated islands of inactive area within active area AA. Input-output components such as cameras, ambient light sensors, infrared depth sensors, light emitters (e.g., visible light emitters such as a camera flash, infrared light emitters that emit a pattern of infrared light for depth measurements, etc.), proximity sensors, speakers, microphones, and/or other input-output components may be accommodated by the protruding portions or islands of inactive area. Accommodating input-outputs in protruding portions or islands of inactive area within the active area may expand the available active area for displaying images.

Light-based components in device 10 (e.g., light-emitting diodes for status indicator lights and camera flashes, light-based sensors, and/or other optical components) may be overlapped by one or more windows such as window 30 of FIG. 2. Windows such as window 30 may be formed in a transparent portion of display 14, may be formed from a through-hole that passes through an array of pixels in display 14 (e.g., in an active area of display 14), and/or may be formed from transparent members of glass, sapphire, etc. that are mounted in housing 12 (e.g., in a rear housing wall of housing 12, etc.). In some configurations, thin layers of masking structures (e.g., thin black ink layers) may overlap optical windows that are otherwise transparent (e.g., to help obscure an optical component such as an ambient light sensor from view). In such configurations, light transmission may be reduced, but sufficient light is still passed to allow the optical window with the thin black ink coating to serve as an optical window for an optical component (e.g., an ambient light sensor in this example).

In some configurations, device 10 may have front and rear surfaces such as front surface F and rear surface R of FIG. 2. When device 10 is in an unfolded configuration, the front and rear surfaces may be lie in parallel planes on opposing sides of device 10. Display 14 may be mounted in housing 12 on front surface F, whereas a planar rear housing wall in housing 12 forms rear surface R. In a folded configuration, portions of front surface F may face each other while portions of rear surface R may face away from each other. Alternatively, in the folded configuration, portions of rear surface R may face each other while portions of front portion F may face away from each other.

Figure 3:
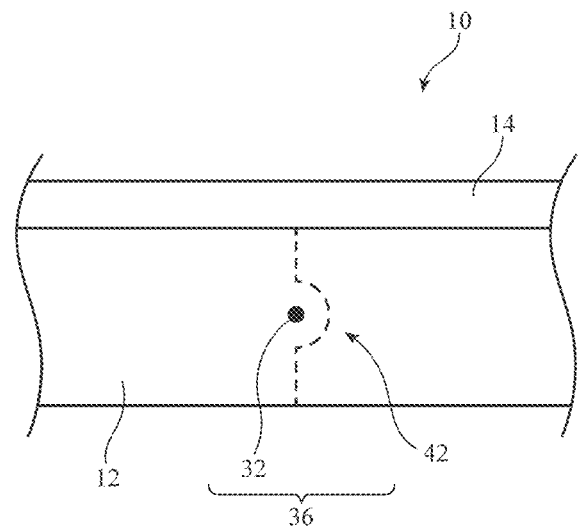
FIG. 3 is a side view of an illustrative electronic device with a hinge in accordance with some embodiments.
Figure 4:
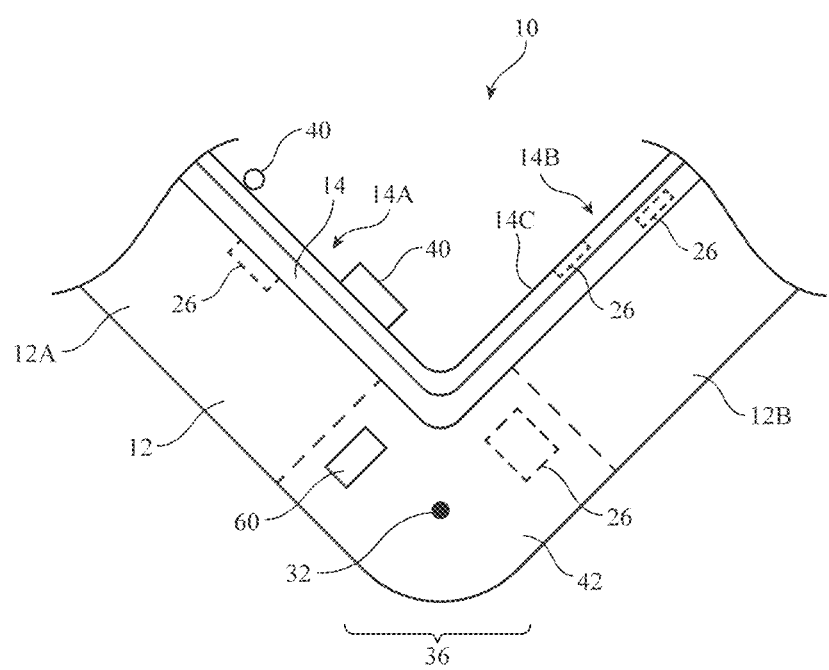
FIG. 4 is a side view of an illustrative electronic device in a partially folded configuration in accordance with some embodiments.

FIG. 3 is a side view of a portion of device 10 showing how display 14 may overlap a hinge in housing 12 such as hinge 42 at bendable region 36. Housing 12 may have first and second housing portions such as first housing portion 12A and second housing portion 12B. Hinge 42 runs along bend axis 32 and allows first housing portion 12A and second housing portion 12B to rotate relative to each other about bend axis 32, as shown in FIG. 4. Display 14 may include first display region 14A overlapping first housing portion 12A and second display region 14B overlapping second housing portion 12B. Display 14 may extend continuously across bend axis 32, if desired, so that images can be displayed uninterrupted across housing portions 12A and 12B.

Device 10 may, as an example, bend by 180° so that portions of housing 12 fold back on themselves. Hinge 42 may be configured to support other amounts of bending (e.g., more or less than 180° about axis 32), if desired. Hinge 42 may include rotating interlocking structures, may include multi-element linkages, may include flexible sheets of material that flex about axis 32 and therefore serve as hinge structures, may include accordioned and/or selectively thinned layers of material that promote flexing, and/or may include other suitable hinge structures that support rotation of portions of device 10 about axis 32.

Portions of display 14 may become hidden from view as device 10 is folded (e.g., when first and second halves or other portions of housing 12 rotate until they are adjacent to each other and overlap each other). Other portions of display 14 may be configured to remain exposed when device 10 is folded.

As shown in FIG. 4, display 14 may be overlapped by a display cover layer such as cover layer 14C. Display cover layer 14C may be attached to display 14 using one or more optically clear adhesive layers, if desired. Display cover layer 14C may include one or more transparent layers of glass, polymer, sapphire, adhesive, and/or any other desired material. Display cover layer 14C may have a high transparency (e.g., greater than 80%, greater than 90%, greater than 95%, greater than 99%, etc.). Display cover layer 14C may have a thickness that is less than 200 microns, less than 100 microns, less than 50 microns, less than 30 microns, greater than 10 microns, greater than 20 microns, greater than 50 microns, between 20 microns and 90 microns, between 10 microns and 200 microns, etc.

Device 10 may include one or more object detection sensors 26 for detecting objects on display 14 such as objects 40. Objects 40 may be any suitable object such as a cellular telephone, a stylus, a pen or pencil, a notebook, a smaller object such as grains of sand or dirt, and/or any other suitable object. FIG. 4 shows various illustrative locations for object detection sensor 26. Object detection sensor 26 may be integrated into or located on display 14 and/or display cover layer 14C, may be integrated into or otherwise located on housing 12, may be integrated into or otherwise located in hinge 42, may be located behind display 14, and/or may be located in any other suitable position in device 10.

Control circuitry such as controller 20 of device 10 may monitor object detection sensors 26 for objects 40 on display 14. When sensor 26 detects object 40 (e.g., for a period of time that is longer than a given threshold), controller 20 may take suitable action by locking hinge 42, deploying a stop structure that prevents full closing of device 10, displaying a warning or other message on display 14, generating a haptic alert and/or an audible alert, and/or taking other actions (e.g., blowing air across display 14 to remove sand or other small particles).

In order to lock hinge 42 or otherwise prevent full closure of device 10, hinge 42 may include one or more actuators such as actuator 60. Actuator 60 may be configured to restrict motion of housing portion 12A relative to housing portion 12B. Actuator 60 may be a pneumatic actuator, a mechanical actuator, an electric actuator, a piezoelectric actuator, a rotary actuator, and/or any other suitable actuator for adjusting the operation of hinge 42. For example, actuator 60 may be configured to deploy a pin, tighten a screw, and/or take other actions to lock hinge 42 in place (e.g., to lock hinge 42 in a fully open or partially open configuration) to prevent device 10 from being fully closed when an object such as object 40 is detected on display 14. When object detection sensor 26 detects object 40 on display 14, controller 20 may send control signals to actuator 60 to lock hinge 42 and prevent full closing of device 10.

Figure 5:
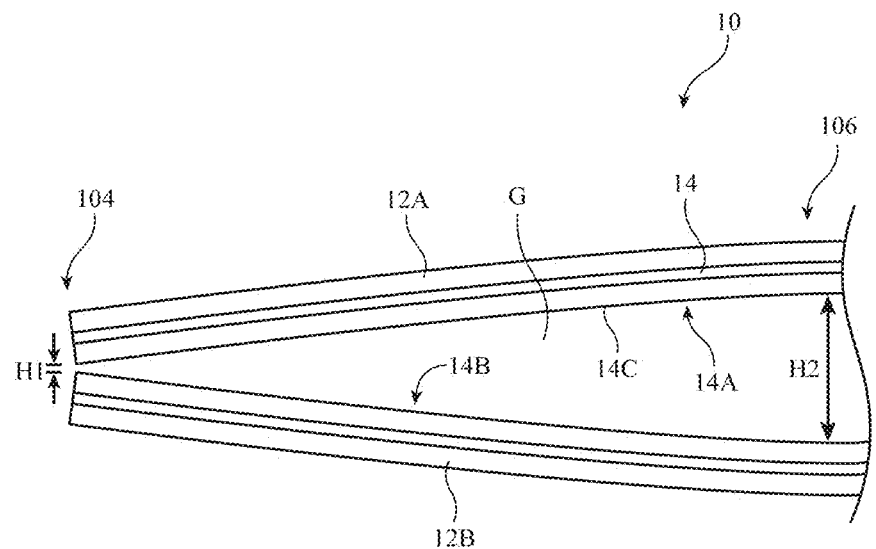
FIG. 5 is a side view of an illustrative electronic device in a folded configuration and having a tapered gap between first and second display regions in accordance with some embodiments.

In some arrangements, a gap may be present between first display region 14A and second display region 14B when device 10 is folded closed. As shown in FIG. 5, for example, device 10 may have a tapered gap G between first display region 14A and second display region 14B. With this type of arrangement, the gap G between first display region 14A and second display region 14B may range from a minimum height such as height H1 at end 104 of device 10 to a maximum height such as height H2 at opposing end 106 of device 10 (e.g., near hinge 42 of FIG. 4). This type of tapered gap between display regions 14A and 14B may permit some objects 40 to be enclosed within device 10 even when device 10 is folded closed, depending on the size and location of the object. If desired, object detection sensor 26 may be configured to determine the size of object 40 (e.g., the height of object 40 relative to display region 14A and/or display region 14B) as well as the position of object 40 to determine whether action needs to be taken. For example, if sensor 26 detects that object 40 is located near end 104 and has a height that is greater than height H1, controller 20 may lock hinge 42, deploy a stop structure, generate a visual alert, haptic alert, and/or audible alert, and/or may take other suitable actions. If, on the other hand, sensor 26 detects that object 40 is located near end 106 and has a height that is greater than height H1 but less than height H2, controller 20 may not take any action and may allow device 10 to fully close.

Figure 6:
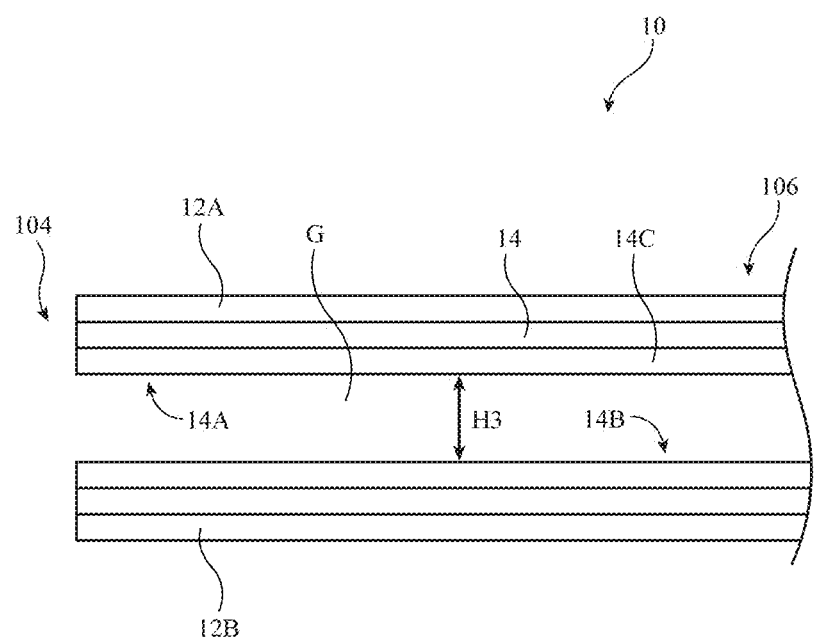
FIG. 6 is a side view of an illustrative electronic device in a folded configuration and having a non-tapered gap between first and second display regions in accordance with some embodiments.

In the example of FIG. 6, the gap G between display region 14A and display region 14B is mostly constant. For example, most of display region 14A and most of display region 14B are separated by a gap G having constant height H3. If desired, a larger gap may exist in hinge region 42 to accommodate the bending radius of display 14 (e.g., hinge 42 of FIG. 4 may have a teardrop shape). Since the gap G between display region 14A and display region 14B is mostly constant, controller 20 may take into account the size of object 40 without necessarily taking into account the position of object 40 when determining whether or not to lock hinge 42 or take other suitable action. For example, if sensor 26 detects that object 40 has a height that is greater than height H3, controller 20 may lock hinge 42, deploy a stop structure, generate a visual alert, haptic alert, and/or audible alert, and/or may take other suitable actions.

Adjusting the operation of device 10 based on the position and/or size of object 40 is merely illustrative. If desired, controller 20 may adjust the operation of device 10 based on the shape of object 40 (e.g., whether object 40 is blunt or sharp), the weight of object 40, the material of object 40 (e.g., whether object 40 is soft or hard), the type of object 40, and/or other characteristics about object 40 that are measured with object detection sensor 26. Any of these characteristics may be taken into account when determining whether to take action and what type of action to take (e.g., whether the hinge should be locked and at what position it should be locked, whether an alert should be generated, etc.). The size of the gap that is maintained between display region 14A and display region 14B when object 40 is detected may be based on the measured height of object 40 or may be a predetermined gap size that is not based on any measurements of object 40.

Figure 7:
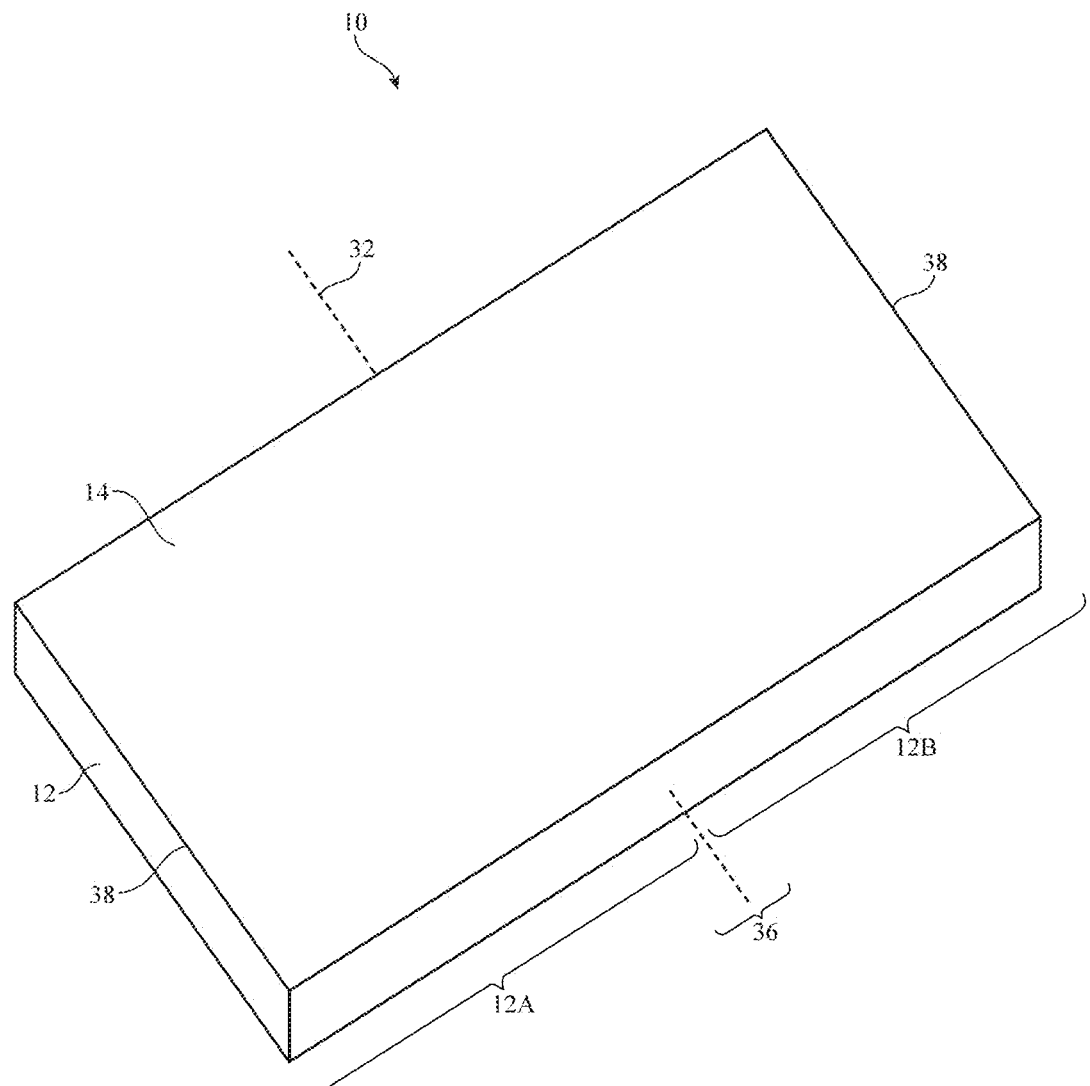
FIG. 7 is a perspective view of an illustrative electronic device in an unfolded configuration in accordance with some embodiments.

FIG. 7 shows device 10 in an unfolded configuration (also referred to as a flat configuration, an open configuration, etc.). As shown in FIG. 7, bend axis 32 may run through a central portion of device 10. For example, bend axis 32 may run through the center of device 10, display 14, and/or housing 12. In other words, bend axis 32 may be located at an equal distance with respect to edges 38 of housing 12. This is merely illustrative. In general, bend axis 32 may be located in any suitable portion of device 10, display 14, and/or housing 12 to allow device 10 to bend and/or fold at bending region 36.

Figure 8:
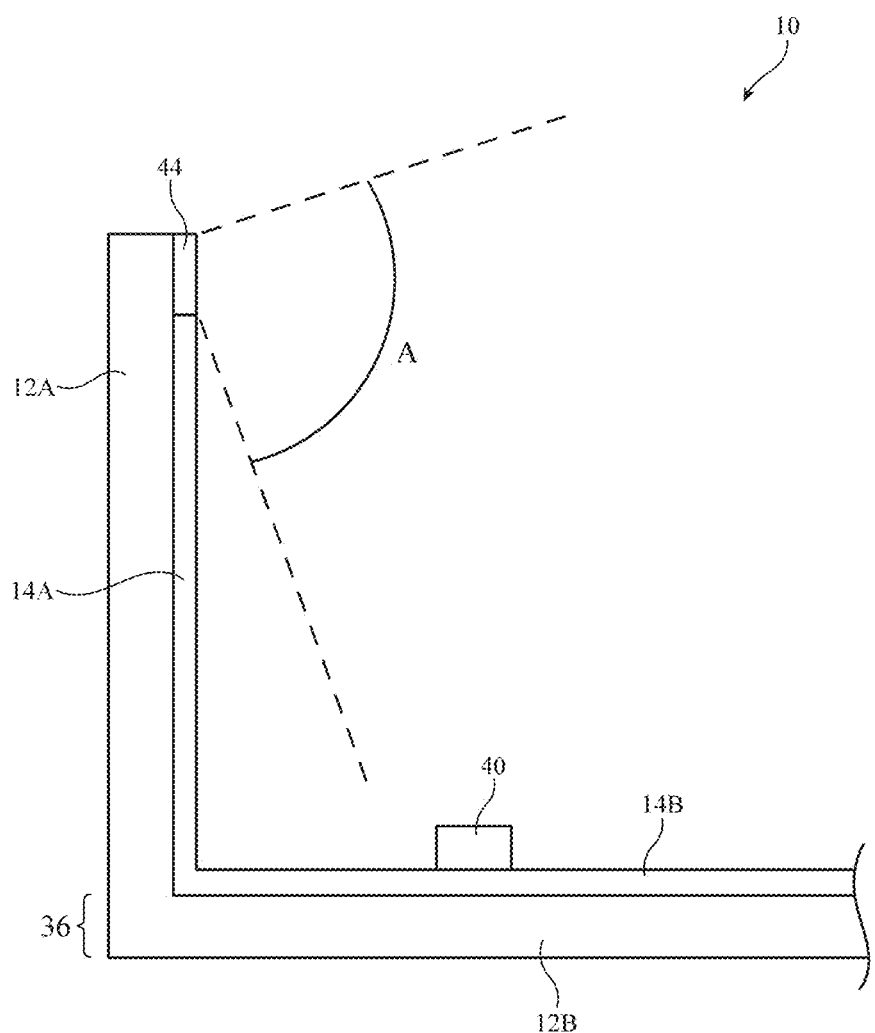
FIG. 8 is a perspective view of an illustrative electronic device having an object detection sensor such as an image sensor in accordance with some embodiments.

FIG. 8 is a perspective view of device 10 showing how object detection sensor 26 may be formed from an image sensor such as camera 44. Camera 44 may be a visible light camera for capturing images and video, or camera 44 may be an infrared camera for capturing infrared images. For example, camera 44 may be an infrared camera that forms part of a depth sensing system in device 10 (e.g., for capturing facial images for user identification and/or authentication purposes). With this type of arrangement, an infrared light source may emit structured infrared light (e.g., a pattern of dots) and camera 44 may detect the reflected infrared light to measure depth (e.g., to capture a depth map of a face or other objects in the environment). Camera 44 may have a field of view A that is wide enough to detect object 40 on display 14. Controller 20 may analyze the captured images to determine when object 40 is present and/or to determine the size, shape, and/or position of object 40 on display 14. If desired, the captured images may be analyzed using image recognition techniques to determine the type of object (e.g., a cellular telephone, a stylus, a pen, etc.).

Figure 9:
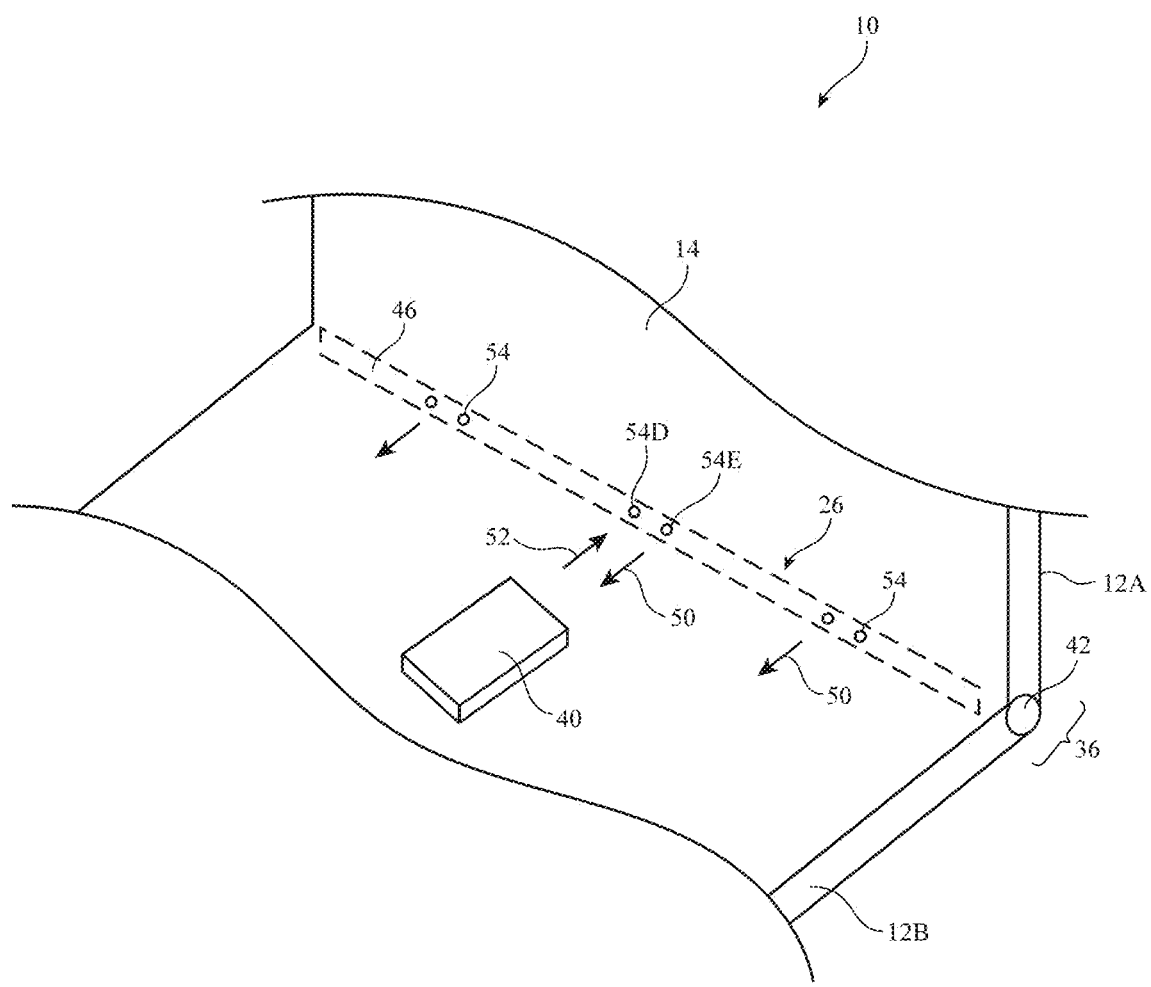
FIG. 9 is a perspective view of an illustrative electronic device having a one or more object detection sensors located along a hinge axis of the electronic device in accordance with some embodiments.

In the example of FIG. 9, object detection sensor 26 is formed from sensors 54 that include one or more emitters 54E and one or more detectors 54D. Emitters 54E may be configured to emit signals 50 across display 14, while detectors 54D may be configured to detect reflected signals that are reflected off of object 40 on display 14. Based on the emitted signals 50 and detected reflected signals 52, sensors 54 may be configured to determine whether object 40 is present (and, if desired, the size and/or location of object 40). An array of sensors 54 can be arranged in a strip such as strip 46 along bending region 36 (e.g., overlapping hinge 42 or adjacent to hinge 42), may be located along one or more edges of display 14 (e.g., portions of housing 12 that border display 14), and/or may be located elsewhere in device 10.

In some arrangements, sensor 54 may be an optical sensor (e.g., a visible light and/or infrared light sensor such as an infrared proximity sensor). With this type or arrangement, emitters 54E may include one or more infrared light-emitting devices such as lasers and/or light-emitting diodes and detectors 54D may include one or more infrared light detectors for detecting reflected infrared light.

In some arrangements, sensor 54 may be an ultrasonic sensor. For example, emitter 54E may be an ultrasonic sound emitter (e.g., a speaker, a micromachined ultrasonic transducer, a vibrating element, etc.) and detector 54D may be an ultrasonic sound detector (e.g., a microphone, a micromachined ultrasonic transducer, etc.). Configurations in which sensor 54 has an array of ultrasonic sensor components may also be used. These components may perform echolocation (time-based measurements) and/or signal strength measurements to determine when object 40 is present and to measure the position of object 40.

If desired, radio-frequency sensors, position, orientation, and/or motion sensors, force sensors, temperature sensors, magnetic sensors, and/or other sensors may be used in gathering presence information and/or relative position information from object 40. The foregoing examples are illustrative.

Figure 10:
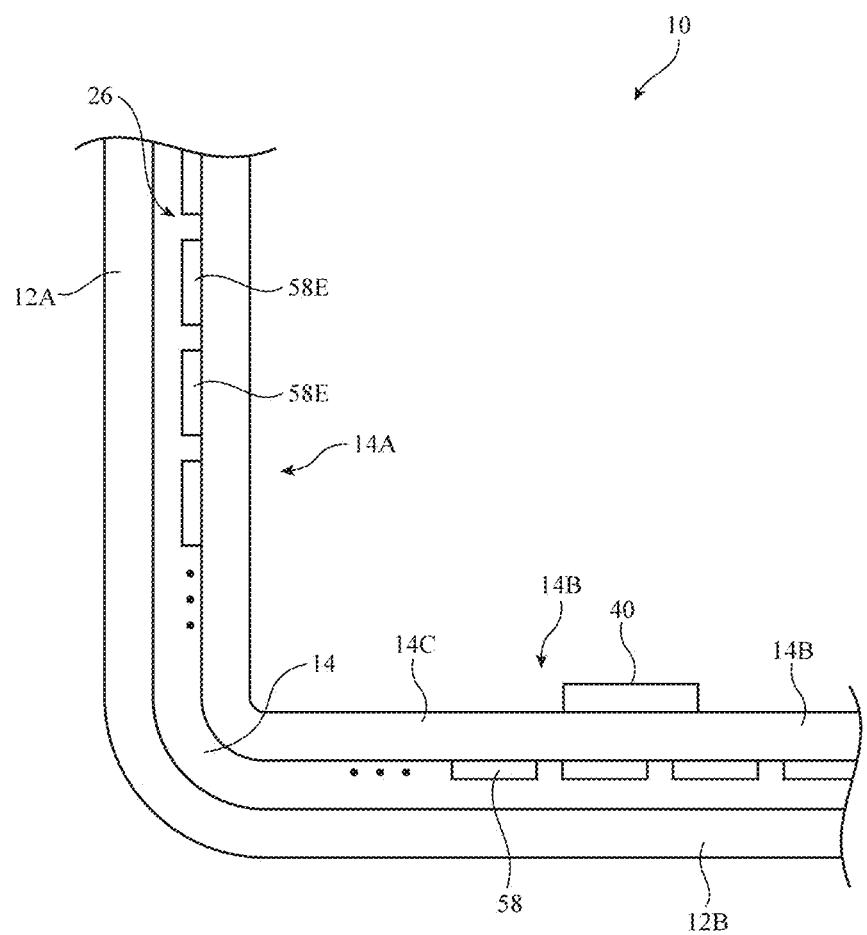
FIG. 10 is a side view of an illustrative electronic device having an object detection sensor such as a touch sensor in accordance with some embodiments.

In the example of FIG. 10, object detection sensor 26 is formed from a touch sensor in device 10 such as touch sensor 58. As shown in FIG. 10, display 14 may include an array of pixels for displaying images and an overlapping touch sensor 58 having array of transparent capacitive touch sensor electrodes 58E. In some arrangements, electrodes 58E may form a two-dimensional capacitive sensor array overlapping display 14 (e.g., display 14 may have a touch sensor and some or all of the touch sensor electrodes can gather touch and/or proximity measurements to measure the position of object 40). In other arrangements, touch sensor 58 may only overlap a portion of display 14 or may be located elsewhere in device 10 (e.g., on housing 12 facing display 14 but otherwise not overlapping display 14). For example, electrodes 58E may form an elongated strip that runs along an edge of display 14 and/or housing 12. Arrangements in which electrodes 58E form part of a touch sensor for detecting touch input on display 14 are sometimes described herein as an illustrative example.

Figure 11:
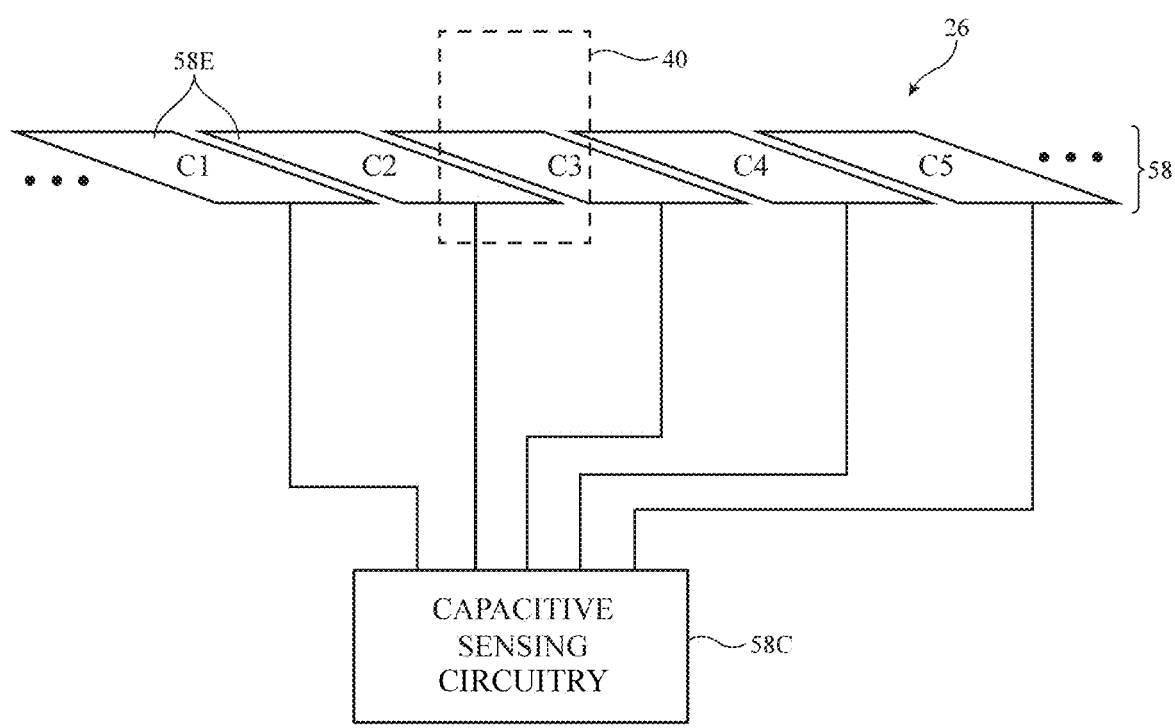
FIG. 11 is a diagram of an illustrative capacitive touch sensor for detecting objects on a display in accordance with some embodiments.

Electrodes 58E may be formed from metal traces on a printed circuit, transparent conductive structures on a printed circuit or overlapping a display, and/or other conductive electrode structures organized in an array (e.g., a two-dimensional array or a one-dimensional array). As shown in FIG. 11, capacitive sensing circuitry 58C (e.g., a self-capacitance circuit or a mutual-capacitance circuit) may be used in gathering position information (proximity measurements and/or touch sensor measurements) using the capacitive sensor readings from electrodes 58E (and, if desired, optional additional electrodes such an active shield, ground, etc.). Electrodes 58E may have any suitable shapes (e.g., rectangular shapes, trapezoidal shapes, diamond shapes, circular shapes, square shapes, other shapes with curved and/or straight edges, other shapes with two or more non-orthogonal edges such as the edges associated with tapered finger protrusions and/or tapered recesses, etc.).

Consider, as an example, a scenario in which object 40 (e.g., a device with a metal housing sensed by electrodes 58E) overlaps sensor 58 as shown in FIG. 11. In this arrangement, capacitors C1 and C5 are not overlapped, so controller 20 can conclude that object 40 lies between capacitors C1 and C5. The left edge of object 40 overlaps electrodes C2 and C3 and the right edge of object 40 overlaps electrodes C3 and C4. The capacitance values measured using electrodes C2 and C3 can be processed to determine the location of the left edge of object 40. The capacitance values measured using electrodes C3 and C4 can be processed to determine the location of the right edge of object 40. Other overlapping (tiled) electrode shapes can be used in strip-shaped capacitive sensor 58, if desired. Electrodes 58E may be formed from metal traces on a printed circuit (e.g., in configurations in which sensor 58 lies below the pixels of display 14) or may be formed from indium tin oxide pads or other transparent electrode structures (e.g., in configurations in which the electrodes overlap display pixels).

If desired, object detection sensor 26 may be configured to distinguish intentional touch input from a user from objects that are resting on display 14. For example, touch sensor 58 may be configured to determine a time period that an object is in contact with display 14. Objects that are in contract with the display for shorter time periods (e.g., time periods less than a given time threshold) may be assumed to be intentional user input such as touch input, stylus input, etc. Objects that are in contract with the display for longer time periods (e.g., time periods greater than the given time threshold) may be assumed to be objects 40 resting on the display such as an electronic device, a stylus, a pen or pencil, and/or other object resting on the display (rather than an object providing intentional user input).

Figure 12:
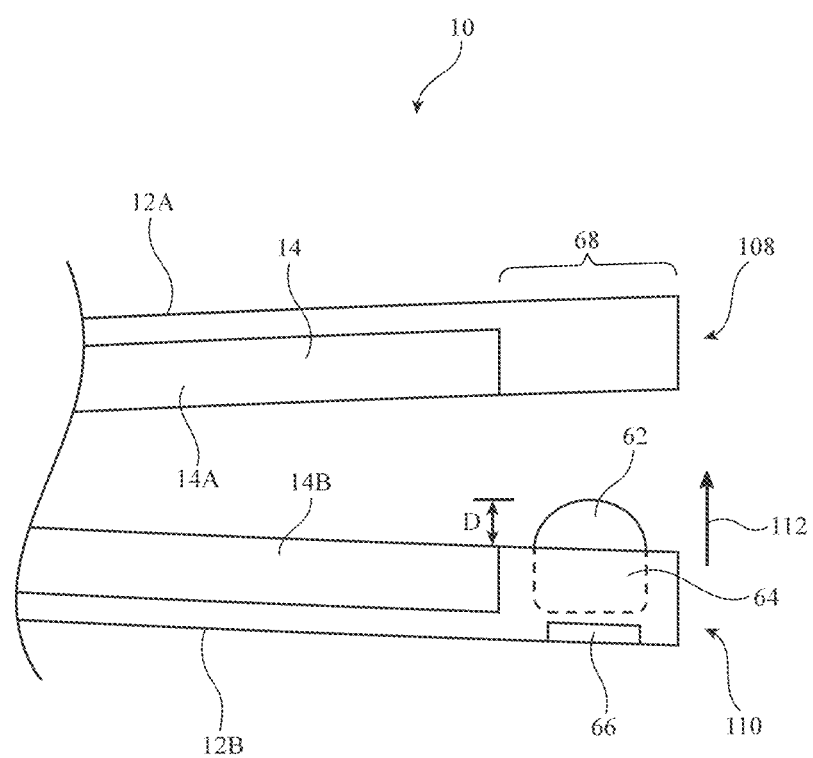
FIG. 12 is a side view of an illustrative electronic device having a retractable stop structure for maintaining a gap between first and second display regions when an object is detected on the display in accordance with some embodiments.

FIG. 12 is a side view of electronic device 10 showing how a stop structure may be deployed in response to detecting object 40 on display 14. As shown in FIG. 12, housing 12 may have a frame or bezel region such as bezel 68. Bezel 68 may extend around some or all of the periphery of display 14. If desired, bezel 68 may have a larger width in some portions of device 10 than in other portions of device 10. For example, first and second opposing edges of device 10 that are perpendicular to bend axis 32 may have a relatively thin bezel 68 or may have no bezel at all (e.g., display 14 may extend all the way to these edges of device 10). Device 10 may have third and fourth opposing edges such as edges 108 and 110 that are parallel to bend axis 32 and that have wider bezel regions 68, if desired. This is merely illustrative. If desired, bezel 68 may have a uniform width around the periphery of display 14 or may be thinner at edges 108 and 110 than other edges of device 10.

As shown in FIG. 12, one or more stop structures such as stop structure 62 may be mounted in bezel 68 of housing 12 and may be configured to restrict movement of housing portion 12A relative to housing portion 12B. Stop structure 62 may be used to maintain a minimum gap D between display region 14A and display region 14B when object detection sensor 26 detects object 40 on display 14. Stop structure 62 may be a compressible member, an inflatable member, a rubber or other elastomeric structure, and/or other suitable stop structure.

If desired, stop structure 62 may be operable in a retracted state and a deployed state. An actuator such as actuator 66 may be configured to control the position of stop structure 62 based on sensor data from object detection sensor 26. When object detection sensor 26 does not detect any objects 40 on display 14 that might cause damage to display 14, stop structure 62 may remain retracted (e.g., recessed) in a cavity of housing 12 such as recess 64 in bezel 68. When stop structure 62 is in the retracted state within recess 64, device 10 may be permitted to fully close without being obstructed by stop structure 62. When object detection sensor 26 detects an object 40 on display 14 that might cause damage to display 14, controller 20 may send control signals to actuator 66 to deploy stop structure 62 by pushing stop structure 62 out of recess 64 in direction 112. When stop structure 62 is deployed, bezel 68 on housing portion 12A may contact stop structure 62 when a user attempts to close device 10, thereby preventing further movement of housing portion 12A towards housing portion 12B so that a minimum gap D may be maintained between display region 14A and display region 14B.

Figure 13:
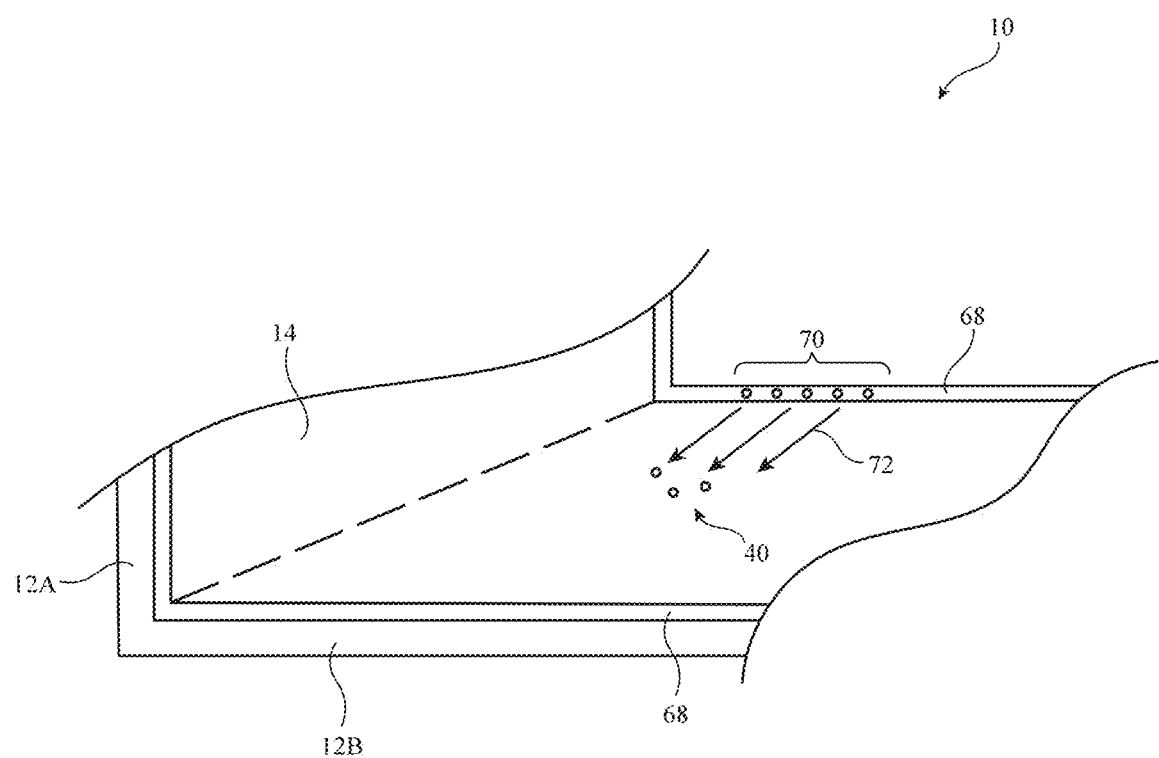
FIG. 13 is a perspective view of an illustrative electronic device having apertures from which air is ejected to clear particles from a display surface in accordance with some embodiments.

FIG. 13 is a perspective view of device 10 showing how air may be used to clean particles off of display 14 to prevent damage to display 14. As shown in FIG. 13, bezel 68 may include one or more apertures such as apertures 70. Apertures 70 may be speaker holes for transmitting audio from an underlying speaker or may be openings for an underlying fan. In either case, apertures 70 may be used to eject air such as air 72 across display 14. Ejecting air 72 across display 14 may help clear off smaller objects 40 on display 14 such as sand and other particles. A fan or speaker in housing 12 may be used to eject air through apertures 70 based on sensor data from object detection sensor 26. When object detection sensor 26 detects small particles or other objects 40 on display 14, controller 20 may send control signals to the fan or speaker to push air through apertures 70 and across the surface of display 14 to help clear the particles off of display 14. When object detection sensor 26 does not detect any particles or other objects 40 that might cause damage to display 14, controller 20 may turn off the speaker or fan or may otherwise reduce the air that is pushed through apertures 70.

Figure 14:
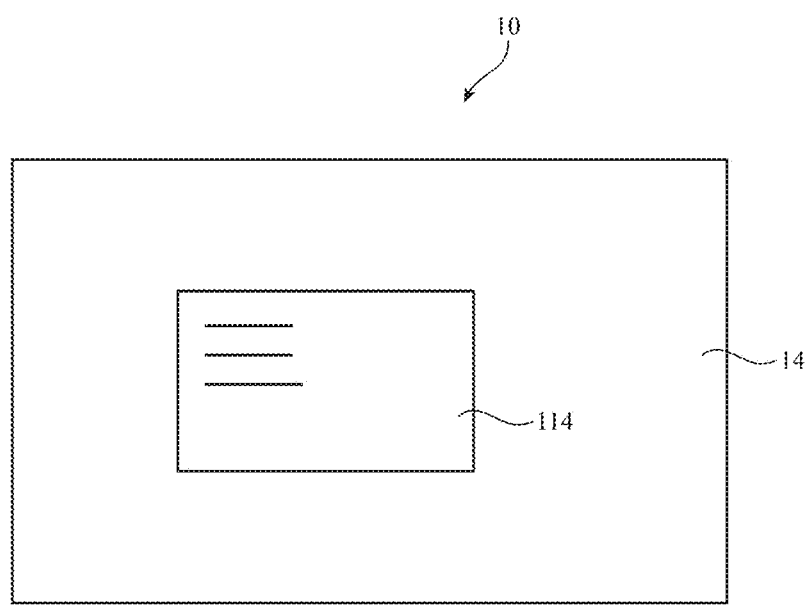
FIG. 14 is a perspective view of an illustrative electronic device having a display that may be used to present a message to a user when an object is detected on the display in accordance with some embodiments.

FIG. 14 is a perspective view of device 10 showing how display 14 may be used to display a warning or message based on sensor data from object detection sensor 26. As shown in FIG. 14, display 14 may display image 114 in response to object detection sensor 26 detecting an object 40 on display 14 that might cause damage to display 14 if device 10 is closed while the object 40 is present. Image 114 may be a message instructing the user to clean the screen or otherwise remove object 40 from display 14, may be a warning that a blunt or sharp object is present and the user should not close device 10, may be a symbol or status indicator, and/or may be any other suitable image. When object detection sensor 26 detects particles, a device, or other object 40 on display 14, controller 20 use display 14 to display image 114 to alert the user of the presence of the object and/or to instruct the user not to close device 10. When object detection sensor 26 does not detect any particles or other objects 40 that might cause damage to display 14, controller 20 may remove image 114 or may adjust image 114 to let the user know that object 40 has been cleared and/or that device 10 can safely be closed.

Figure 15:
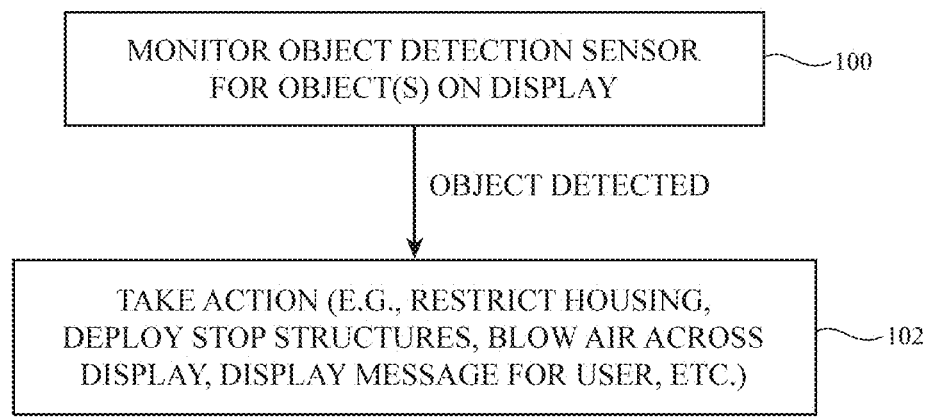
FIG. 15 is a flow chart of illustrative steps involved in operating an electronic device when an object is detected on the display in accordance with some embodiments.

FIG. 15 is a flow chart of illustrative steps involved in operating an electronic device such as electronic device 10 having an object detection sensor such as object detection sensor 26.

During the operations of block 100, controller 20 may monitor object detection sensor 26 for the presence of objects 40 on display 14. This may include, for example, analyzing image data from an image sensor such as image sensor 44 of FIG. 8, analyzing optical data and/or ultrasonic data from sensors 54 of FIG. 9, analyzing capacitive sensor data from a capacitive touch sensor and/or a capacitive force sensor such as capacitive sensor 58 of FIGS. 10 and 11, and/or analyzing sensor data from other object detection sensors in device 10 (e.g., radio-frequency sensors, position, orientation, and/or motion sensors, temperature sensors, magnetic sensors, and/or other sensors).

The operations of block 100 may include analyzing sensor data from object detection sensor 26 to determine the time period that object 40 is present on display 14 and/or to determine the size, position, shape, and/or other characteristics of object(s) 40 on display 14. Some sizes of objects, shapes of objects, and positions of objects may not cause any damage to display 14 even if device 10 is closed (e.g., because the object 40 can safely fit within a gap between display region 14A and display region 14B even when device 10 is closed), and so some objects 40 that are detected may not warrant any further action by controller 20 (e.g., device 10 may be permitted to fully close even when some objects 40 are present). This is merely illustrative. If desired, any object 40 detected on display 14 may trigger actions by controller 20 to protect display 14 regardless of the size or position of object 40.

If an object 40 is detected on display 14 for a period of time longer than a given threshold (e.g., longer than a time period of a typical touch input from a finger or stylus), processing may proceed to block 102.

During the operations of block 102, controller 20 may take suitable action by locking hinge 42 (e.g., using actuator 60 of FIG. 4), deploying a stop structure (e.g., stop structure 62 of FIG. 12), pushing air across display 14 (e.g., as shown in FIG. 13), displaying a warning or other message on display 14 (e.g., message 114 of FIG. 14), generating an audible alert and/or a haptic alert, and/or taking other suitable action to protect display 14 from damage.

The foregoing is merely illustrative and various modifications can be made to the described embodiments. The foregoing embodiments may be implemented individually or in any combination.

What is claimed is:

1. An electronic device, comprising:
   a foldable housing having first and second housing portions that rotate relative to one another about a fold axis;
   a flexible display overlapping the fold axis and having first and second display regions that respectively overlap the first and second housing portions;
   an object detection sensor configured to detect an object on the flexible display; and
   an actuator configured to restrict movement of the first housing portion relative to the second housing portion in response to detecting the object on the flexible display with the object detection sensor.

2. The electronic device defined in claim 1 wherein the object detection sensor comprises an image sensor.

3. The electronic device defined in claim 2 wherein the image sensor comprises a visible light camera.

4. The electronic device defined in claim 2 wherein the image sensor comprises an infrared camera.

5. The electronic device defined in claim 1 wherein the object detection sensor comprises a capacitive sensor.

6. The electronic device defined in claim 5 wherein the capacitive sensor overlaps the flexible display and is configured to detect touch input on the flexible display.

7. The electronic device defined in claim 1 wherein the foldable housing comprises a hinge coupled between the first and second housing portions and wherein the actuator is configured to lock the hinge to restrict movement of the first housing portion relative to the second housing portion in response to detecting the object on the flexible display with the object detection sensor.

8. The electronic device defined in claim 1 further comprising a stop structure recessed within the foldable housing, wherein the actuator is configured to deploy the stop structure to restrict movement of the first housing portion relative to the second housing portion in response to detecting the object on the flexible display with the object detection sensor.

9. The electronic device defined in claim 1 wherein the flexible display is configured to display a message in response to detecting the object on the flexible display with the object detection sensor.

10. The electronic device defined in claim 1 further comprising apertures in the foldable housing through which air is blown across the flexible display in response to detecting the object on the flexible display with the object detection sensor.

11. An electronic device, comprising:
    a housing having first and second housing portions that fold relative to one another about a fold axis;
    a flexible display overlapping the fold axis and having first and second display regions that respectively overlap the first and second housing portions;
    a touch sensor configured to detect touch input on the flexible display and configured to detect an object resting on the flexible display; and
    a controller configured to take action in response to detecting the object on the flexible display with the object detection sensor, wherein the action is selected from the group consisting of: restricting movement of the first housing portion relative to the second housing portion, displaying a message on the flexible display, generating a haptic alert, generating an audible alert, and blowing air across the flexible display.

12. The electronic device defined in claim 11 further comprising an actuator configured to restrict movement of the first housing portion relative to the second housing portion in response to control signals from the controller.

13. The electronic device defined in claim 12 wherein the housing comprises a hinge coupled between the first and second housing portions and wherein the actuator is configured to lock the hinge in response to the control signals from the controller.

14. The electronic device defined in claim 12 further comprising a stop structure recessed within the housing, wherein the actuator is configured to deploy the stop structure in response to the control signals from the controller.

15. The electronic device defined in claim 11 wherein the touch sensor is configured to distinguish the touch input from the object resting on the flexible display based on a period of time associated with the touch input and the object resting on the flexible display.

16. An electronic device, comprising:
    a housing having first and second housing portions coupled by a hinge;
    a flexible display overlapping the first and second housing portions and the hinge; and
    an object detection sensor configured to detect an object resting on the flexible display, wherein the hinge is configured to lock in response to detecting the object resting on the flexible display with the object detection sensor.

17. The electronic device defined in claim 16 further comprising an actuator configured to lock the hinge in response to detecting the object resting on the flexible display with the object detection sensor.

18. The electronic device defined in claim 16 wherein the object detection sensor comprises at least one of: an infrared camera and a visible light camera.

19. The electronic device defined in claim 16 wherein the object detection sensor comprises a capacitive force sensor.

20. The electronic device defined in claim 16 wherein the object detection sensor comprises a sensor selected from the group consisting of: an optical sensor, an ultrasonic sensor, a strain gauge, and a radio-frequency sensor.

* * * * *